(12) United States Patent
Yano

(10) Patent No.: US 6,357,403 B1
(45) Date of Patent: Mar. 19, 2002

(54) METHOD AND SYSTEM FOR CONTROLLING INTERNAL COMBUSTION ENGINE

(75) Inventor: Hirofumi Yano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/606,237

(22) Filed: Jun. 29, 2000

(30) Foreign Application Priority Data

Jun. 30, 1999 (JP) .......................................... 11-186867

(51) Int. Cl.$^7$ ................................................. F01L 9/04
(52) U.S. Cl. ................................ 123/90.11; 123/90.15; 123/339; 123/339.1; 123/339.14; 123/339.19
(58) Field of Search ........................... 123/90.11, 90.15, 123/90.16, 90.17, 399, 339, 339.14, 339.19, 339.1, 406.58; 73/116

(56) References Cited

U.S. PATENT DOCUMENTS

| 4,760,825 A | * | 8/1988 | Morita ........................ 123/340 |
| 5,765,528 A | | 6/1998 | Kamimaru ............. 123/339.19 |
| 6,009,852 A | * | 1/2000 | Akabori ................. 123/339.19 |

FOREIGN PATENT DOCUMENTS

JP        10-37787        2/1998

* cited by examiner

Primary Examiner—Thomas Denion
Assistant Examiner—Jaime Corrigan
(74) Attorney, Agent, or Firm—Foley & Lardner

(57) ABSTRACT

A method of controlling an internal combustion engine having an electromagnetically actuated intake valve for a cylinder. The controlling method comprises (a) forming first and second control regions in accordance with an engine speed of the engine, the first control region being higher in engine speed than the second control region; (b) calculating opening and closing timings of the intake valve in synchronism with a first cylinder synchronous signal in the first control region, the first cylinder synchronous signal being generated in synchronism with a stroke of an operating cycle of a cylinder; (c) calculating the opening and closing timings of the intake valve in synchronism with a second cylinder synchronous signal in the second control region, the second cylinder synchronous signal being generated in synchronism with the stroke of the operating cycle of a cylinder and after generation of the first cylinder synchronous signal; and (d) controlling an amount of intake air to be supplied to the cylinder in accordance with the calculated opening timing of the intake valve.

6 Claims, 7 Drawing Sheets

FIG.2A

— HIGH ENGINE SPEED OPERATING REGION —

(a) Ref SIGNAL 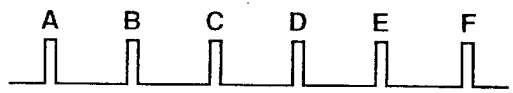

(b) CALCULATION OF OPENING AND CLOSING TIMINGS OF INTAKE VALVE 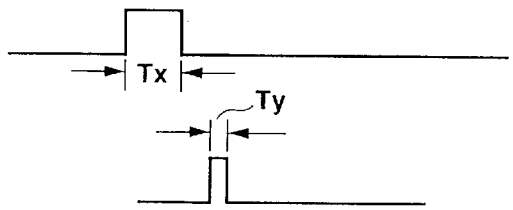

(c) SETTING OF OPENING AND CLOSING TIMINGS OF INTAKE VALVE (d) ACTUATION OF INTAKE VALVE 

FIG.2B

— LOW ENGINE SPEED OPERATING REGION —

(e) Ref SIGNAL 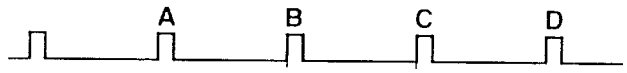

(f) CALCULATION OF OPENING AND CLOSING TIMINGS OF INTAKE VALVE 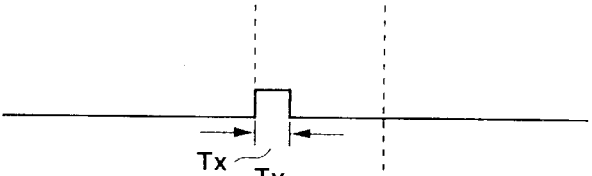

(g) SETTING OF OPENING AND CLOSING TIMINGS OF INTAKE VALVE 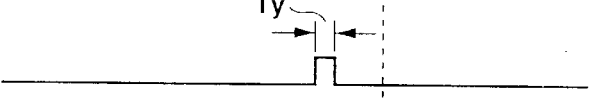

(h) ACTUATION OF INTAKE VALVE 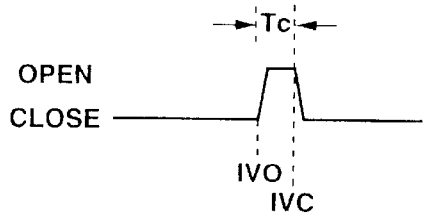

METHOD AND SYSTEM FOR CONTROLLING INTERNAL COMBUSTION ENGINE

BACKGROUND OF THE INVENTION

This invention relates to method and system for controlling an internal combustion engine provided with electromagnetically actuated intake and exhaust valves, and more particularly to the controlling method and system which can suppress variation in engine speed under idling engine operation.

Hitherto a control technique for stabilizing idling engine speed in an internal combustion engine provided with electromagnetically actuated intake and exhaust valves has been proposed in Japanese Patent Provisional Publication No. 10-37787. According to this conventional control technique, a control system includes an intake and exhaust valve opening and closing timing changing means for changing at least one of the opening and closing timings of each intake and exhaust valves, for the purpose of regulating the idling engine speed. Additionally, in such a conventional internal combustion engine provided with electromagnetically actuated intake and exhaust valves, at least two kinds of crank angle sensor signals are used for detecting engine speed and standard position for each cylinder, for the purpose of setting control timings. They are a position (POS) signal representative of a certain rotational angle of a crankshaft, and a reference (REF) signal or cylinder synchronous signal representative of the standard position in an operating cycle of each cylinder. The position signal is generated, for example, every 1 degree of the crank angle.

In the conventional control technique on the assumption that a Ref signal (pulse) represents the intake stroke for a specified cylinder, the opening and closing timings of the intake valve for this cylinder are calculated and set at the timing in synchronism with a Ref signal which is generated two or three Ref signals before the Ref signal representative of the intake stroke for the specified cylinder. Here, the reason why the calculation and setting are made in synchronism with such a considerably preceding Ref signal and not in synchronism with the immediately preceding Ref signal is to ensure a certain software prosecution time even in a high engine speed operating range where the interval between the adjacent Ref signals is relatively short, in the control system in which the calculating and setting of the opening and closing timings of the intake valve is usually carried out using a software in a microprocessor as an electronic control unit.

SUMMARY OF THE INVENTION

Drawbacks have been encountered in the above conventional control technique, in which the opening and closing timing of the intake valve are calculated and set always in synchronism with the Ref signal generated two or three Ref signals before the Ref signal representative of the intake stroke for the specified cylinder, regardless of engine speed of the conventional engine provided with the electromagnetically actuated intake and exhaust valves. Accordingly, in a low engine speed operating range such as idling, a considerable time has lapsed from calculation and setting of the opening and closing timing of the intake valve to actual opening and closing of this intake valve to suck air into the cylinder, so that engine speed may be lowered during this considerable time. However, such a lowered engine speed cannot be corrected, and therefore stability of engine revolution is degraded in the low engine speed operating range, particularly at idling.

In addition, in the engine provided with the electromagnetically actuated intake valves, each intake valve is operated to open and close at the previously set opening and closing timings. Accordingly, when the engine speed is lowered, the opening and closing time durations of the intake valve are relatively shortened to movement of the piston, as compared with a conventional internal combustion engine provided with cam-operated intake valves and arranged such that the opening and closing time durations of the intake valve are momentarily increased or decreased under the action of the cam operated in synchronism with the piston. Thus, in the engine provided with the electromagnetically actuated intake valves, the amount of intake air to be sucked into the cylinder is further lowered thereby further lowering the engine speed.

Therefore, it is an object of the present invention to provide improved method and system for controlling an internal combustion engine provided with electromagnetically actuated engine valves, which can effectively overcome drawbacks encountered in conventional controlling methods and systems for an internal combustion engine of the same type.

Another object of the present invention is to provide an improved method and system for controlling an internal combustion engine provided with electromagnetically actuated engine valves, which can effectively suppress an engine speed variation during a low engine speed operation such as idling, thereby achieving stable idling operation of the engine.

A first aspect of the present invention resides in a method of controlling an internal combustion engine having an electromagnetically actuated intake valve for a cylinder, comprising: (a) forming first and second control regions in accordance with an engine speed of the engine, the first control region being higher in engine speed than the second control region; (b) calculating opening and closing timings of the intake valve in synchronism with (at a timing synchronized with) a first cylinder synchronous signal in the first control region, the first cylinder synchronous signal being generated in synchronism with a stroke of an operating cycle of a cylinder; (c) calculating the opening and closing timings of the intake. valve in synchronism with a second cylinder synchronous signal in the second control region, the second cylinder synchronous signal being generated in synchronism with the stroke of the operating cycle of a cylinder and after generation of the first cylinder synchronous signal; and (d) controlling an amount of intake air to be supplied to the cylinder in accordance with the calculated opening timing of the intake valve.

A second aspect of the present invention resides in a method of controlling an internal combustion engine having first, second and third cylinders whose operating cycles are carried out in the sequence set forth, the third cylinder being provided with an electromagnetically actuated intake valve, the method comprising: (a) forming first and second control regions in accordance with an engine speed of the engine, the first control region being higher in engine speed than the second control region; (b) calculating opening and closing timings of the intake valve in synchronism with a first cylinder synchronous signal in the first control region, the first cylinder synchronous signal being generated in synchronism with a stroke of an operating cycle of the first cylinder and before the stroke of the operating cycle of the third cylinder; (c)calculating the opening and closing timings of the intake valve in synchronism with a second cylinder synchronous signal in the second control region, the second cylinder synchronous signal being generated in synchronism with the stroke of the operating cycle of the second cylinder and after generation of the first synchronous signal, the second cylinder synchronous signal being generated before the stroke of the operating cycle of the third cylinder; and (d) controlling an amount of intake air to be supplied to the cylinder in accordance with the calculated opening timing of the intake valve.

A third aspect of the present invention resides in a method of controlling an internal combustion engine having an electromagnetically actuated intake valve for a cylinder, comprising: (a) calculating opening and closing timings of the intake valve in synchronism with a first cylinder synchronous signal which is generated in synchronism with a stroke of an operating cycle of a cylinder; and (b) again calculating at least the closing timing of the intake valve in synchronism with a second cylinder synchronous signal when an idling engine speed is lowered after generation of the first cylinder synchronous signal so as to maintain the idling engine speed at a predetermined level, the second cylinder synchronous signal being generated in synchronism with the stroke of the operating cycle of a cylinder and after generation of the first cylinder synchronous signal.

A fourth aspect of the present invention resides in a method of controlling an internal combustion engine having an electromagnetically actuated intake valve for a cylinder, comprising: (a) providing an electromagnetic actuator having an opening-side electromagnet which causes the intake valve to open upon flowing current therethrough and close upon interruption of the current; and (b) causing current to flow through the opening-side electromagnet of the electromagnetic actuator after interruption of flow of the current to the opening-side electromagnet, when an engine speed of the engine is lowered after a closing timing of the intake valve is set.

A fifth aspect of the present invention resides in a control system for an internal combustion engine having an electromagnetically actuated intake valve for a first cylinder. The control system comprises an engine speed sensor for detecting an engine speed of the engine, and a cylinder synchronous signal sensor for detecting cylinder synchronous signals which correspond to predetermined timings of operating cycles of the first cylinder and other cylinders, respectively. Additionally, a control unit is provided to be configured to perform (a) determining a plurality of control regions in accordance with the engine speed detected by the engine speed sensor, and (b)calculating and setting opening and closing timings of the intake valve for the first cylinder, in synchronism with different cylinder synchronous signals respectively in the different control regions.

BRIEF DESCRIPTION OF THE DRAWINGS

FIG. 2A is a graphical representation including timing charts showing various timings in a high engine speed operating region in the engine of FIG. 1;

FIG. 2B is a graphical representation including timing charts showing various timings in a low engine speed operating region in the engine of FIG. 1;

DETAILED DESCRIPTION OF THE INVENTION

Figure 1:
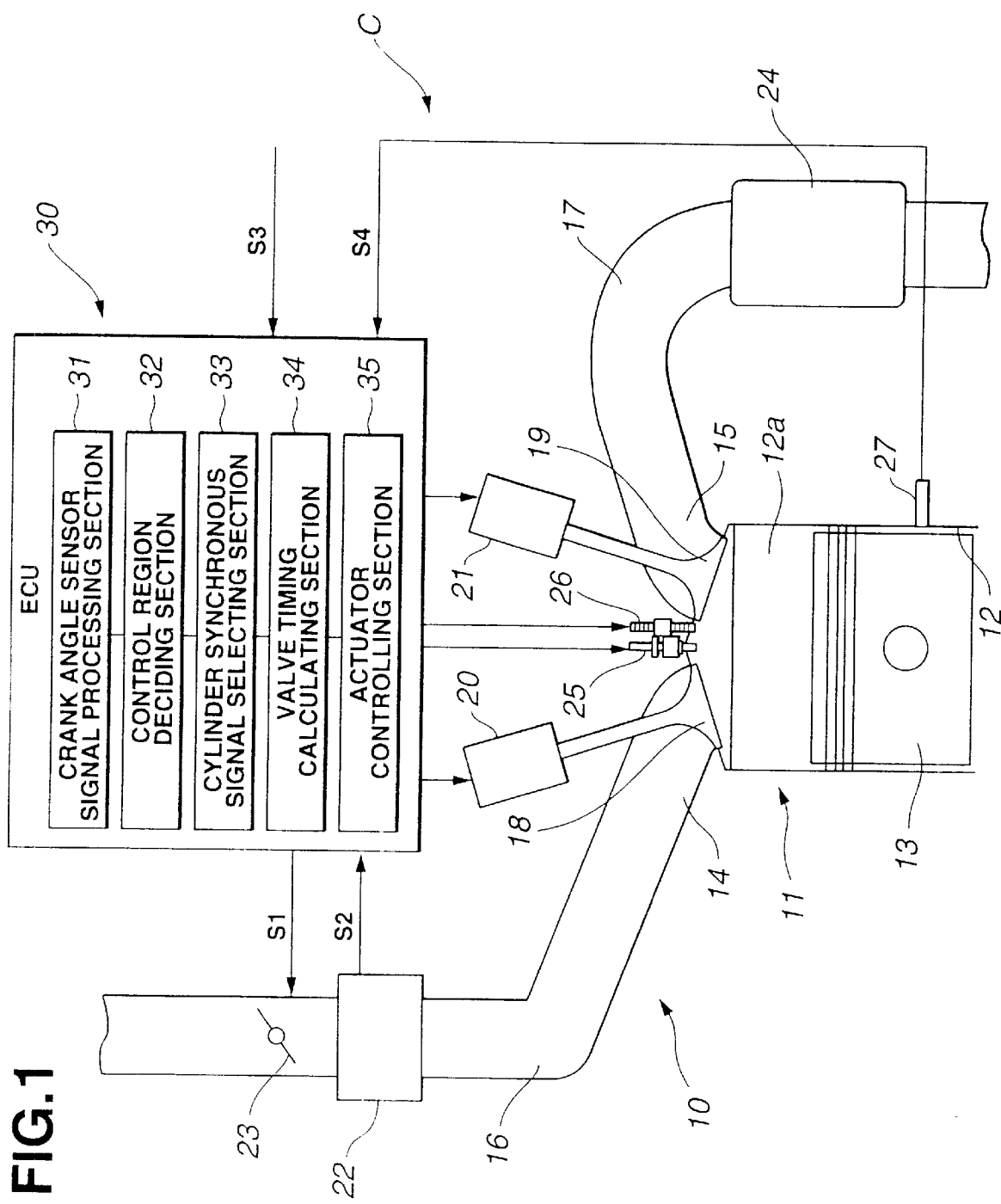
FIG. 1 is a schematic illustration of a first embodiment of a control system for an internal combustion engine, according to the present invention.

Referring now to FIG. 1, a first embodiment of a control system for an internal combustion engine, according to the present invention is illustrated by the reference character C. The control system C is incorporated with the internal combustion engine 10. The engine 10 includes an engine main body 11 which has a plurality of engine cylinders 12, though only one cylinder 12 is shown. A piston 13 is disposed in each cylinder 12 in a reciprocating manner, defining a combustion chamber 12a in the cylinder 12. The engine main body 11 is formed with an intake port 14 and an exhaust port 15 which are respectively connected with an intake air passageway 16 and an exhaust gas passageway 17.

Electromagnetically actuated intake and exhaust valves 18, 19 are movably disposed respectively to the intake and exhaust ports 14, 15. The intake valve 18 is opened to establish communication between the intake port 14 and the cylinder 12 or the combustion chamber 12a, and closed to block the same communication. The exhaust valve 19 is opened to establish communication between the exhaust port 15 and the cylinder 12 or the combustion chamber 12a, and closed to block the same communication. The intake and exhaust valves 18, 19 are drivably connected respectively to electromagnetic actuators 20, 21. The electromagnetic actuator 20 actuates the intake valve 18 to cause the intake valve 18 to open or close. The electromagnetic actuator 21 actuates the exhaust valve 19 to cause the exhaust valve 19 to open or close.

An intake air amount sensor 22 and a throttle valve 23 are provided in the intake air passageway 16. The intake air amount sensor 22 is measured the amount of intake air flowing through the intake air passageway 16 and generates a signal S2 representative of the intake air amount. The throttle valve 23 is in a generally fully opened state under normal engine operating conditions, so that control of the intake air amount for each cylinder 12 can be accomplished by controlling opening and closing timings of the intake valve 18. The exhaust gas passageway 17 is provided with a three-way catalytic converter 24.

A fuel injector valve 25 and a spark plug 26 are provided projecting in the combustion chamber 12a. The fuel injector valve 25 is for injecting fuel into the combustion chamber 12a so as to form air-fuel mixture within the combustion chamber 12a. The spark plug 26 is to produce spark so as to ignite the air-fuel mixture within the combustion chamber 12a.

A crank angle sensor 27 is provided to detect a rotational angle of a crankshaft (not shown) or a camshaft of the engine main body 11. The crank angle sensor 27 is a non-contact rotational angle sensor, for example, of the magnetic type or the photoelectric type. The crank angle sensor 27 is adapted to generate a REF (reference) signal, and a POS (position) signal. The REF signal is generated, for example, at each crank angle of 720 degrees for the purpose of providing the starting point of spark timing of the spark plug 25 and at each crank angle of 180 degrees for the purpose of identifying the respective cylinders 12 in case that the engine 10 is a four-cylinder engine. The POS signal is generated, for example, at each crank angle of 1 degree, for example, for the purpose of counting the spark timing of the spark plug 26 and the opening and closing timings of the intake and exhaust valves 18, 19 from the REF signal serving as the starting point. The REF signals and the POS signal are output as a signal S4 as shown in FIG. 1.

An electronic control unit (ECU) 30 is provided to control the engine main body 11 and includes a crank angle sensor signal processing section 31 which is adapted to process REF and POS signals (corresponding to a signal S4) output from the crank angle sensor 27 and generate an engine speed signal representative of engine speed of the engine 10, a Ref signal representative of a standard timing or position of the piston 13 in each cylinder 12 (which signal corresponds to the above REF signal), and a 1 degree signal representative of the rotational angle of 1 degree of the crank shaft (which signal corresponds to the above POS signal). A control region deciding section 32 is provided forming part of the electronically control unit 30 and adapted to decide as to whether the engine 10 is in a high engine speed operating region (first control region) or in a low engine speed operating region (second control region) in accordance with the engine speed signal. A cylinder synchronous signal selecting section 33 is provided forming part of the electronic control unit 30 and adapted to select cylinder synchronous signals which are in synchronism with (or synchronized with) the above Ref signal, in accordance with the decided engine speed operating region. The opening and closing timings of the intake valve 18 is calculated and set at the cylinder synchronous signals. A valve timing calculating section 34 forming part of the electronic control system 30 is adapted to calculate the opening and closing timings of the intake and exhaust valves in synchronism with the cylinder synchronous signal selected in the cylinder synchronous signal selecting section 33. The valve timing calculating section 34 is also adapted to set the calculated opening and closing timings of the intake and exhaust valves in an actuator controlling section 35 forming part of the electronic control unit 30 and adapted to control a current supply to the electromagnetic actuators 20, 21 when the set opening and closing timings of the intake and exhaust valves 18, 19 come.

The calculation for opening and closing timings of the intake exhaust valves in the valve timing calculating section 34 is accomplished in accordance with an accelerator position signal S3 representative of the position of an accelerator pedal (not shown), an idling condition decision signal (not shown) representative of the condition of idling of the engine 10, and other engine operating condition signals (not shown) representative of other engine operating conditions of the engine 10. This is similar to that in a conventional internal combustion engine provided with electromagnetically actuated intake and exhaust valves, so that a detailed explanation of the content of the calculation in the valve timing calculating section 34 is omitted for the purpose of simplicity of illustration. It will be understood that the throttle valve 23 is adapted to be controlled by a control signal S1 (representative of various engine operating conditions) output from the electronic control unit 30.

A control manner of the opening and closing timings of the intake valve 18 under control of the electronic control unit 30 will be discussed with reference to FIGS. 2A and 2B. FIG. 2A shows an example of the control manner in the high engine speed operating region, while FIG. 2B shows an example of the control manner in the low engine speed operating region, in which the control manner is for one cylinder 12 for the purpose of simplicity of illustration. In FIGS. 2A and 2B, the Ref signals at items (a) and (e) are the cylinder synchronous signals which have been output from the crank angle sensor signal processing section 31 and shaped, and represent the top dead centers in the intake strokes in respective (four) cylinders 12. FIGS. 2A and 2B are timing charts and depict calculation of the opening and closing timings of the intake valve (at items (b) and (f)), setting the opening and closing timings of the intake valve (at items (c) and (g)) and actuation of the intake valve (at items (d) and (h)), respectively in the high and low engine speed operating regions, for the cylinder 12 whose top dead center in intake stroke is indicated by the Ref signal C.

In the high engine speed operating region shown in FIG. 2A, the calculation of the opening and closing timings of the intake valve is made in synchronism with (at a timing synchronized with) the Ref signal A which is two Ref signals before the Ref signal C, as indicated at the item (b) in which Tx represents a time duration required for this calculation. Then, the calculated opening and closing timings of the intake valve are set in the actuator controlling section 35 in synchronism with the Ref signal B following the Ref signal A, as indicated at the item (c) in which Ty represents a time duration required for setting the timings. Thereafter, the intake valve is actuated to open and close at the set opening and closing timings in synchronism with the Ref signal C (serving as the standard timing) following the Ref signal B, as indicated at the item (d).

In the low engine speed operating region as shown in FIG. 2B, the calculation of the opening and closing timings of the intake valve is made in synchronism with the Ref signal B which is one Ref signal before the Ref signal C, as indicated at the item (f) in which Tx represents the time duration required for this calculation. Upon lapse of a certain time after the calculation or upon lapse of a certain rate of a period of generation of the Ref signal after the calculation, the calculated opening and closing timing of the intake valve are set in the actuator controlling section 35, as indicated at the item (g) in which Ty represents the time duration required for setting the timings. Then, the intake valve is actuated to open and close at the set opening and closing timings in synchronism with the Ref signal C (serving as the standard timing) following the Ref signal B, as indicated at the item (h) in which Tc represents a time duration between a time of outputting of the Ref signal C and a time of the intake valve closing timing (IVC). The intake valve opening timing is represented by IVO.

Figure 3:
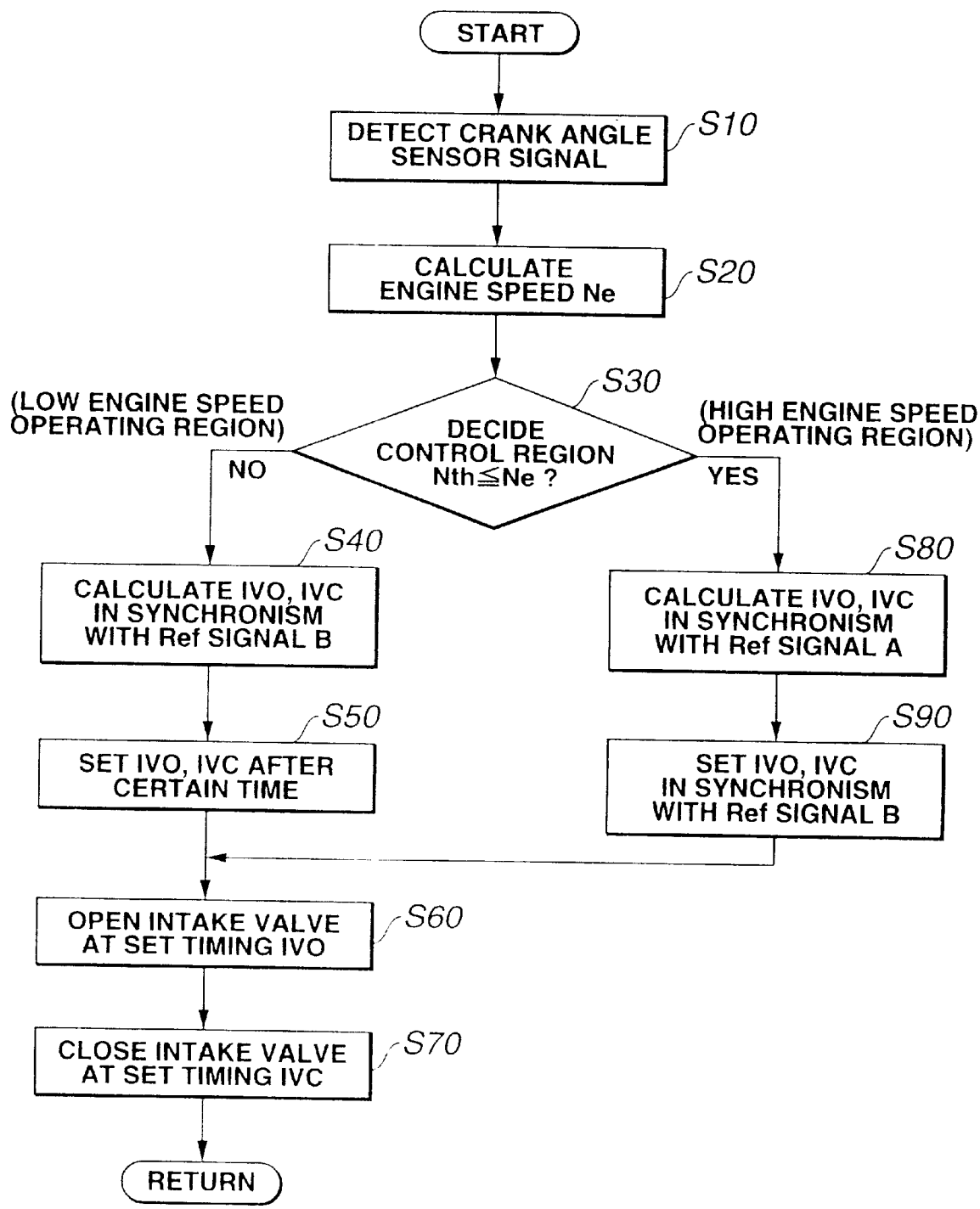
FIG. 3 is a flowchart showing an operation of the control system of FIG. 1.

The above control manner for the engine 10 will be discussed with reference to a flowchart shown in FIG. 3 which is in a case of using the electronic control unit 30 constituted of a microprocessor.

First, the signals of the crank angle sensor 27 are detected at a step S10. Then, the engine speed Ne is calculated in accordance with the signals of the crank angle sensor 27.

Subsequently, a decision is made as to whether the engine operating condition is put into the high engine speed operating region (first control region) or into the low engine speed operating. region (second control region), upon comparison of the engine speed Ne with a threshold engine speed or value Nth (ranging from 500 to 1000 r.p.m.), at a step S30.

In case that the engine speed Ne is lower than the threshold value Nth, it is decided that the engine is operated in the low engine speed operating region. Then, the opening timing (IVO) and closing timing (IVC) of the intake valve are calculated in synchronism with the Ref signal B, at a step S40. Upon lapse of the certain time after the calculation or upon lapse of the certain rate of the period of the Ref signal after the calculation, the opening and closing timing of the intake valve are set at a step S50. Subsequently, when the opening timing (IVO) comes, the electromagnetic actuator 20 is controlled to actuate or open the intake valve at a step S60. Thereafter, the closing timing (IVC) of the intake valve comes, the electromagnetic actuator 20 is controlled to actuate or close the intake valve at a step S70, followed by returning a flow of the flowchart.

In case that the engine speed Ne is not lower than the threshold valve Nth as a result of the decision at the step S30, it is decided that the engine is operated in the high engine speed operating region. Then, the opening timing (IVO) and closing timing (IVC) of the intake valve are calculated in synchronism with the Ref signal A at a step S80. Subsequently, the opening and closing timings of the intake valve are set in synchronism with the Ref signal B at a step S90, followed by the flow going to the step S60.

As discussed above, according to this embodiment, the cylinder synchronous signal for calculating the opening and closing timings of the intake valve is changed over in accordance with the high or low engine speed operating range. Specifically, the opening and closing timings of the intake valve are calculated in synchronism with the Ref signal A which is two Ref signals before the Ref signal C with which the intake valve is actuated in the high engine speed operating region, while the opening and closing timings of the intake valve are calculated in synchronism with the Ref signal B which is one Ref signal before the Ref signal C with which the intake valve is actuated. Accordingly, a high precision control for the opening and closing timings of the intake valve can be accomplished as compared with a case where calculation of the opening and closing timings of an intake valve is made always in synchronism with the Ref signal A.

The threshold engine speed Nth as a standard for deciding the high or low engine speed operating region is preferably set at a value near an idling engine speed, thereby effectively preventing the idling engine speed from lowering owing to disturbance and/or increased engine load thus stabilizing the idling engine speed at a high accuracy.

While the engine operation has been shown and described as being divided into the high and low (two) engine operating regions, it will be understood that the engine operation may not be limited to be divided into two engine operating regions and therefore may be divided into three or more engine operating regions in which different cylinder synchronous signals are selected as standards for calculating the opening and closing timings of the intake valve, for the respective engine operating regions.

Figure 6:
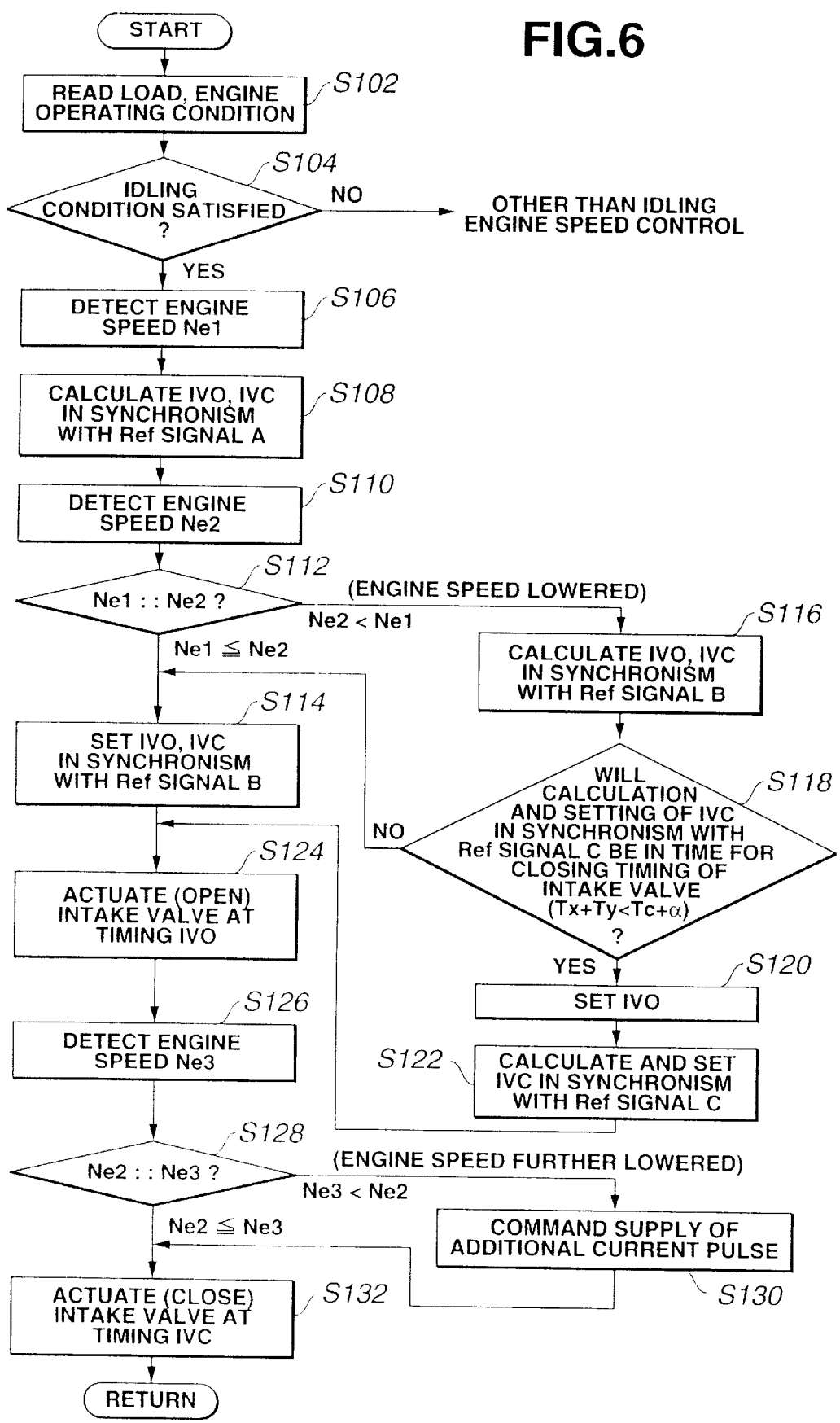
FIG. 6 is a flowchart showing an operation of the control system of the second embodiment.
Figure 7:
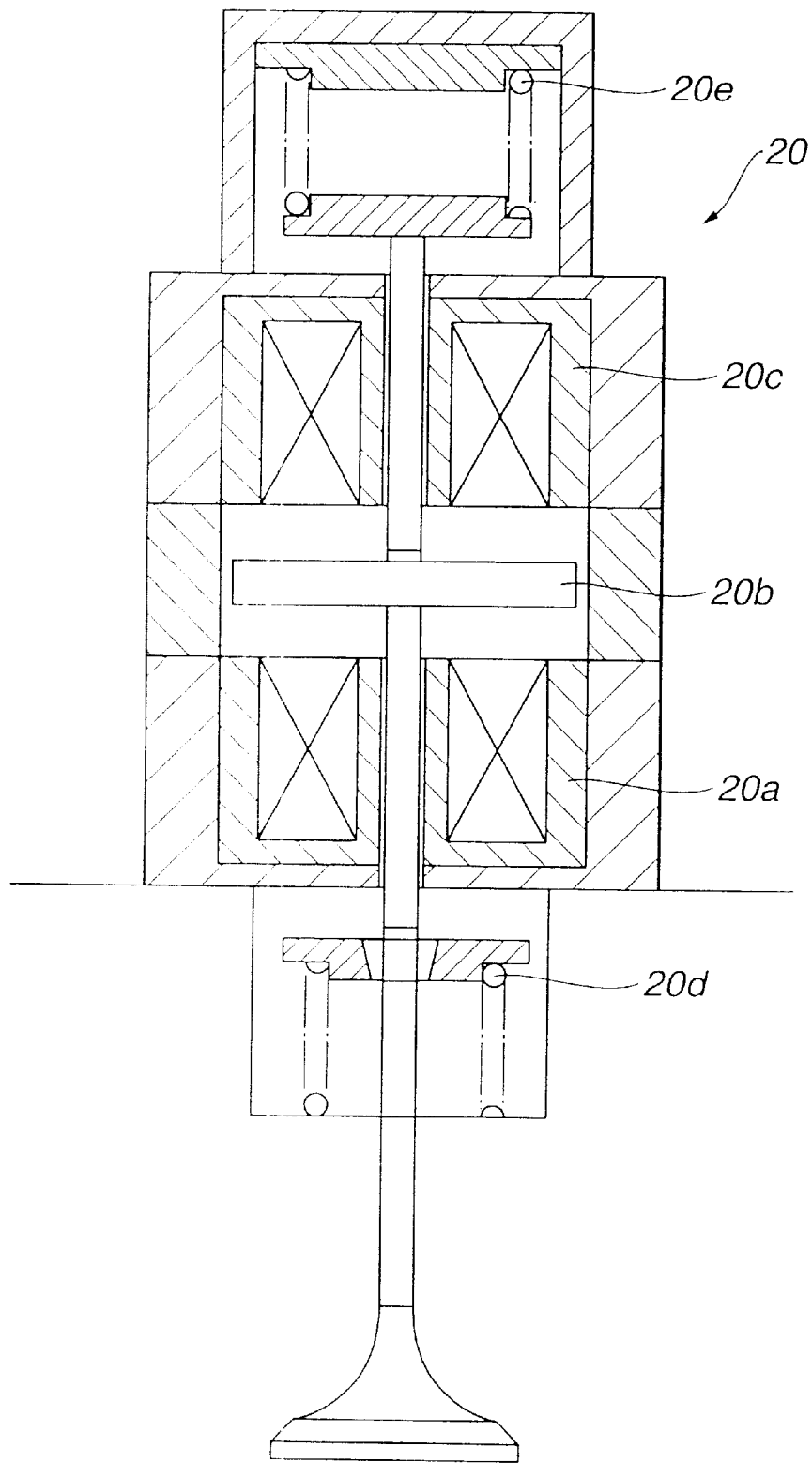
FIG. 7 is a schematic cross-sectional view of the electromagnetic actuator for the intake valve, forming part of the second embodiment of the control system.

Next, a second embodiment of the control system C according to the present invention will be discussed with reference to FIGS. 4 to 6. The control system C of this embodiment and the engine 10 are the same in construction as those of the first embodiment, and therefore the detailed explanation of them are omitted, in which the electronic control unit 30 is constituted of a microprocessor. The control system C includes the electromagnetic actuators 20 for the intake valves 18. Each of the electromagnetic actuators 20 is arranged as shown in FIG. 7 and includes an opening-side electromagnet 20a which has a coil (no numeral) and is adapted to attract downward an armature 20b connected to the intake valve 18 upon being supplied with so-called catching current so as to open the intake valve 18. The opening-side electromagnet 20a can hold the armature 20b at a neutral position shown in FIG. 7 upon being supplied with so-called holding current (in an ON state). Such a holding state at the neutral position can be released upon interrupting the holding current (in an OFF state). A closing-side electromagnet 20c is disposed on the opposite side of the armature 20b relative to the opening-side electromagnet 20a and has a coil (no numeral). The closing-side electromagnet 20c is adapted to attract upward the armature 20b connected to the intake valve 18 upon being supplied with so-called catching current so as to close the intake valve 18. The closing-side electromagnet 20a can hold the armature 20b at the neutral position shown in FIG. 7 upon being supplied with so-called holding current (in an ON state). Such a holding state at the neutral position can be released upon interrupting the holding current (in an OFF state). An opening-side and closing-side springs 20d, 20e are respectively disposed to bias upward and downward the armature 20b. It will be understood that the electromagnetic actuator 21 of each exhaust valve 19 has a similar arrangement to that of the electromagnetic actuator 20 of each intake valve 18.

Figure 4:
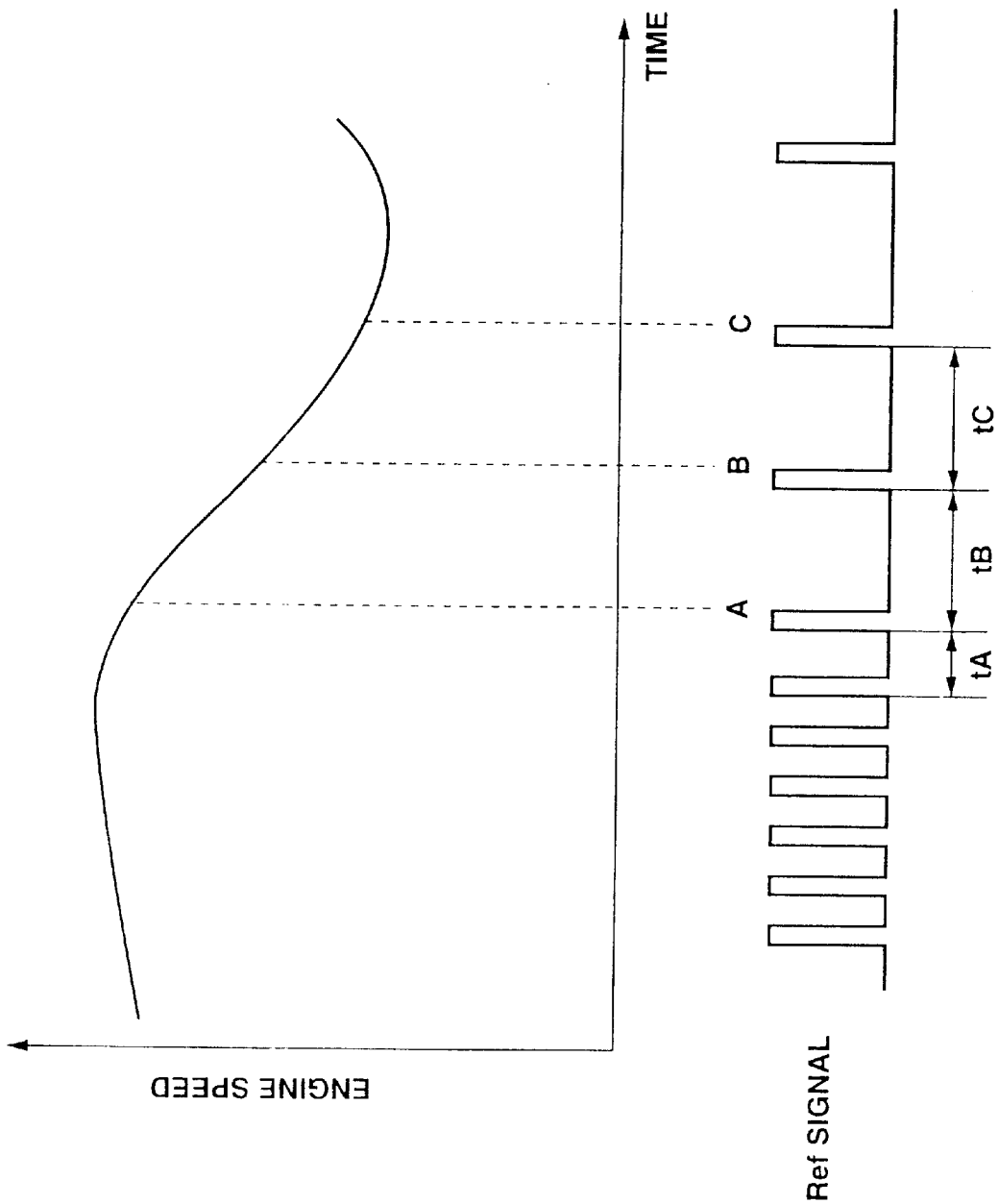
FIG. 4 is a timing chart for a control of opening and closing timings of an intake valve in an idling engine speed control in a second embodiment of the control system according to the present invention.

A manner of an idling engine speed control according to this embodiment is illustrated in FIG. 4 which is a timing chart for calculation of the opening and closing timings of the intake valve 18.

As depicted in FIG. 4, assume that an engine speed change is made as indicated as a curve in the upper part of the FIG. 4. The Ref signal is the cylinder synchronous signal which has been output from the crank angle sensor signal processing section 31 and shaped, and represents the top dead center (or the standard timing) in the intake stroke in respective (four) cylinders 12, similarly to that in the first embodiment.

Here, it will be understood that a time required for a crank shaft rotation of 180 degrees can be obtained by measuring a time between the Ref signal immediately before the Ref signal A and the Ref signal A. In accordance with the thus obtained time, an engine speed (Ne1=1/(2tA)) at the timing of the Ref signal A can be calculated. Similarly, the engine speed (Ne2=1/(2tB)) at the timing of the Ref signal B and the engine speed (Ne3=1/(2tC)) at the timing of the Ref signal C can be calculated.

Subsequently, explanation will be made for a calculation timing of the opening and closing timings of the intake valve 18 in the cylinder whose intake stroke generates the Ref signal C serving as the standard timing. First, the opening and closing timings (IVO, IVC) of the intake valve is calculated in synchronism with the Ref signal A. Subsequently, a decision is made as to whether or not the engine speed at the timing of the Ref signal B is lowered relative to that at the timing of the Ref signal A. If not lowered, the previously calculated opening and closing timings (IVO, IVC) are set in synchronism with the Ref signal B. If lowered, the opening and closing timings (IVO, IVC) of the intake valve 18 are again calculated in synchronism with the Ref signal B and set. As a result, the opening and closing timings of the intake valve 18 are precisely set thereby preventing the intake air amount from lowering when the idling engine speed is lowered. This effectively stabilizes the control of the idling engine speed. Thus, the idling engine speed can be maintained at a predetermined level (for example, between 500 to 600 r.p.m.).

Furthermore, a decision is made as to whether or not calculation and setting of the closing timing (IVC) of the intake valve 18 will be in time for the closing timing of the intake valve. If will be in time for the closing timing, the closing timing (IVC) of the intake valve 18 is calculated and set in synchronism with the Ref signal C.

Figure 5:
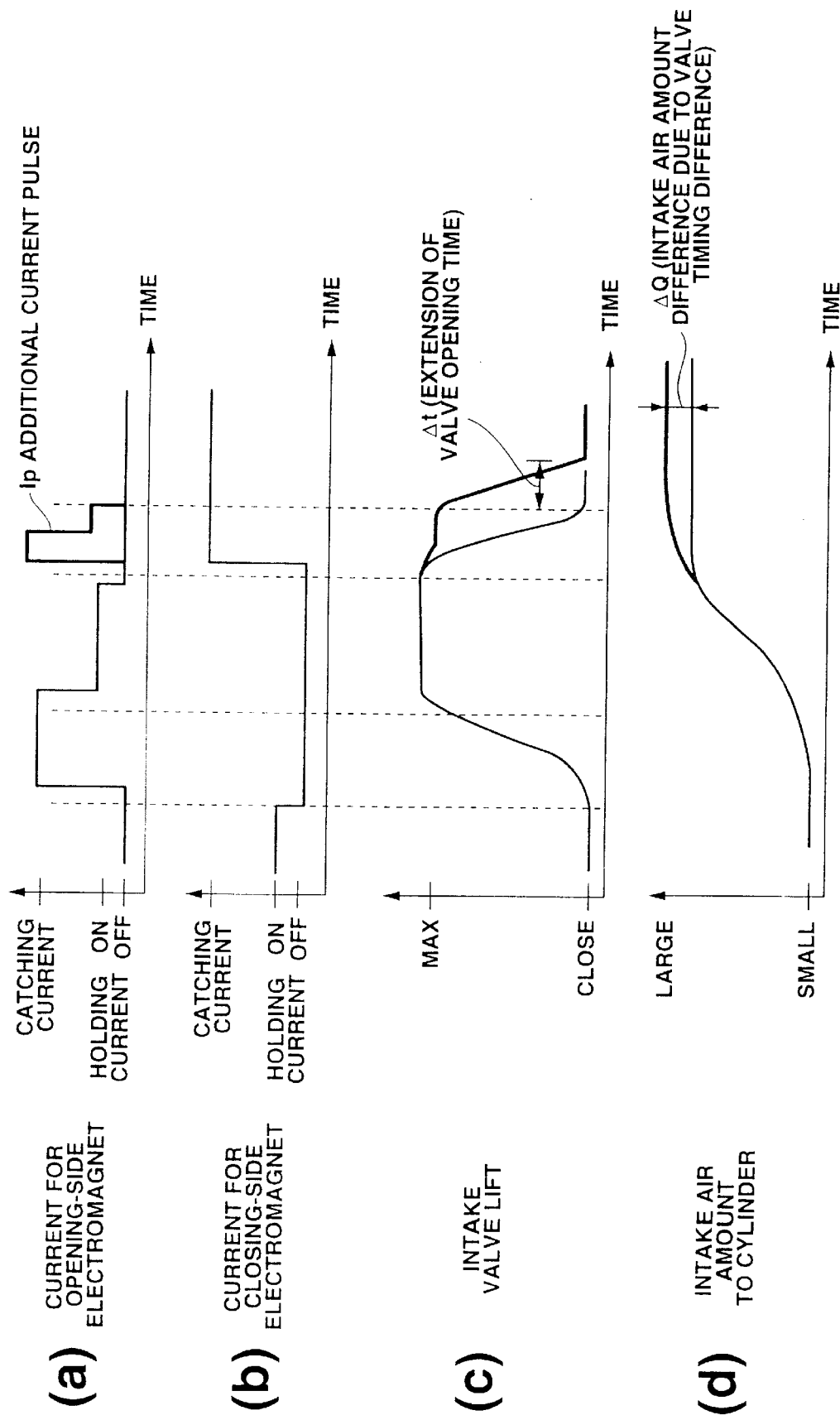
FIG. 5 is a graphical representation including timing charts showing various timings, for another control of opening and closing timings of the intake valve in the idling engine speed control in the second embodiment, in which an item (a) indicates a wave form of current to be supplied to an opening-side electromagnet of an electromagnetic actuator; an item (b) indicates a wave form of current to be supplied to a closing-side electromagnet of the electromagnetic actuator; an item (c) indicates a variation in valve lift of the intake valve; and an item (d) indicates a variation in amount of intake air to be supplied to a cylinder of the engine.

Simultaneously with the opening and closing of the intake valve 18 at the set IVO and IVC, an additional current pulse Ip can be commanded to be supplied to the opening-side electromagnet 20a of the electromagnetic actuator 20 shown in FIG. 7 even after supply of the holding current to the opening-side electromagnet 20a is interrupted as indicated at item (a) in FIG. 5, if a further engine speed lowering at the timing of the Ref signal C occurs. This retards the closing timing of the intake valve 18 thereby increasing the amount of intake air to be supplied to the cylinder 12, thus preventing the engine speed from being lowered.

More specifically, as shown at the item or time chart (a) in FIG. 5, the additional current pulse Ip is supplied to the opening-side electromagnet 20a for the intake valve 18 after the closing timing (IVC) of the intake valve 18, thereby extending an opening duration of the intake valve 18 so as to increase the amount of intake air to be supplied to the cylinder 12. The time chart (a) indicates a wave form of current supplied to the opening-side electromagnet 20a of the electromagnetic actuator 20; the time chart (b) indicates a wave form of current supplied to the closing-side electromagnet 20c of the electromagnetic actuator 20; the time chart (c) indicates a curve of the valve lift of the intake valve 18; and the time chart (d) indicates a curve of the amount of the intake air to be supplied to the cylinder 12.

As discussed above, if the engine speed lowering is detected even after the closing timing (IVC) of the intake valve has been set, the additional current pulse Ip can be flown or supplied to the opening-side electromagnet 20a of the electromagnetic actuator 20 for the intake valve 18 even though supply of the holding current to the electromagnet has been interrupted. This can retard the closing timing of the intake valve by a time $\Delta t$ thereby increasing the amount of intake air to be supplied to the cylinder by an amount $\Delta Q$.

The above idling engine speed control for the engine 10 will be discussed with reference to a flowchart shown in FIG. 6.

First, reading is made on an engine load corresponding to the accelerator position signal, an engine load corresponding to ON or OFF of an air conditioner (not shown), and an engine operating condition such as an engine warm-up state, at a step S102. A decision is made as to whether or not the engine loads and the engine operating conditions meet or satisfy an idling condition, at a step S104. If the idling condition is not met, a flow goes to a treatment other than the idling engine speed control.

If the idling condition is met, a target idling engine speed (for example, ranging from 500 to 600 r.p.m.) is set in accordance with the engine load and the engine operating condition, and the engine speed Ne1 at the timing of the Ref signal A is detected in accordance with the crank angle sensor signal, at a step S106. Then, comparison is made between the engine speed Ne1 and the target idling engine speed. In accordance with a result of this comparison, the opening and closing timings (IVO, IVC) of the intake valve are calculated in synchronism with the Ref signal A, at a step S108.

Subsequently, the engine speed Ne2 at the timing of the Ref signal B is detected at a step S110, and then comparison is made between the engine speed Ne1 and the engine speed Ne2 at a step S112. If the engine speed Ne2 is not lowered relative to the engine speed Ne1, the previously set opening and closing timings (IVO, IVC) are set in synchronism with the Ref signal B at a step S114, upon which the flow goes to a step S124. If the engine speed Ne2 is lowered relative to the engine speed Ne1, the opening and closing timings (IVO, IVC) of the intake valve are again calculated in synchronism with the Ref signal B at a step S116.

Then, a decision is made as to whether calculation and setting of the closing timing (IVC) in synchronism with the Ref signal C will be in time for the closing timing of the intake valve 18 at a step S118. In other words, a comparison is made between a sum (Tx+Ty) of the IVC calculation time Tx and the IVC setting time Ty and the time duration Tc (in connection with IVC calculated at the step S116) as shown in FIG. 2B. If the sum (Tx+Ty)<(Tc+α), the decision is made such that the calculation and setting will be in time for the closing timing of the intake valve. The symbol α represents an operational margin and is set at a value which is slightly larger than the maximum value of a retarded intake valve closing timing (IVC) due to repeated calculations. If will be not in time for the closing timing, the flow goes to a step S114 so as to set the opening and closing timings (IVO, IVC) of the intake valve in synchronism with the Ref signal B. If will be in time for the closing timing, the calculated opening timing (IVO) is set at a step S120. Then, the closing timing (IVC) is again calculated in synchronism with the Ref signal C and set at a step S122. Thereafter, the flow goes to a step S124 at which the intake valve is actuated to be opened at the set opening timing (IVO). This is accomplished by interrupting the holding current to the closing-side electromagnet 20c and by passing the catching current to the opening-side electromagnet 20a.

Subsequently, an engine speed Ne3 is detected in synchronism with the Ref signal C at a step S126. Then, comparison is made between the engine speed Ne2 and the engine speed Ne3 at a step S128. If the engine speed Ne3 is lowered relative to the engine speed Ne2, the command for causing the additional current pulse Ip to flow to the opening-side electromagnet is made in order to extend the opening duration of the intake valve 18 (i.e., retarding the closing timing of the intake valve) at a step S130. If the engine speed Ne3 is not lowered relative to th engine speed Ne2, no command for the additional current pulse Ip is made, and the intake valve is actuated to be closed at the set closing timing (IVC) at a step S132.

Thus, if the engine speed is lowered, the opening and closing timings (IVO, IVC) of the intake valve are calculated synchronism with the later cylinder synchronous signal which is generated after the preceding cylinder synchronous signal (for first calculated the opening and closing timings) taking account of the lowered engine speed. This can prevent the idling engine speed from being lowered, or restore the lowered idling engine speed to an original level. Further, if the idling engine speed is lowered even after the closing timing (IVC) of the intake valve is set, the additional current pulse is flown to the opening-side electromagnet of the electromagnetic actuator after the holding current to the opening-side electromagnet 20a is interrupted, thereby retarding the closing timing of the intake valve thus to increase the intake air amount.

While the engine 10 has been shown and described as being of the four-cylinder type in the embodiments, it will be understood that the principle of the present invention may be applied to a variety of internal combustion engines of the other type where the number of cylinders is other than four.

Additionally, the electromagnetic actuator shown in FIG. 7 has been shown and described as forming part of the second embodiment control system, it is appreciated that the electromagnetic actuator in the first embodiment control system may have the same construction as that of the electromagnetic actuator shown in FIG. 7.

The entire contents of Japanese Patent Applications P11-186867 (filed Jun. 30, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A method of controlling an internal combustion engine having an electromagnetically actuated intake valve for a cylinder, comprising:

forming first and second control regions in accordance with an engine speed of the engine, said first control region being higher in engine speed than the second control region;

calculating opening and closing timings of the intake valve in synchronism with a first cylinder synchronous signal in said first control region, said first cylinder synchronous signal being generated in synchronism with a stroke of an operating cycle of a cylinder;

calculating the opening and closing timings of the intake valve in synchronism with a second cylinder synchronous signal in the second control region, said second cylinder synchronous signal being generated in synchronism with the stroke of the operating cycle of a cylinder and after generation of said first cylinder synchronous signal; and controlling an amount of intake air to be supplied to the cylinder in accordance with the calculated opening timing of the intake valve.

2. A method of controlling an internal combustion engine having first, second and third cylinders whose operating cycles are carried out in the sequence set forth, the third cylinder being provided with an electromagnetically actuated intake valve, said method comprising:

forming first and second control regions in accordance with an engine speed of the engine, said first control region being higher in engine speed than said second control region;

calculating opening and closing timings of the intake valve in synchronism with a first cylinder synchronous signal in said first control region, said first cylinder synchronous signal being generated in synchronism with a stroke of an operating cycle of the first cylinder and before the stroke of the operating cycle of the third cylinder;

calculating the opening and closing timings of the intake valve in synchronism with a second cylinder synchronous signal in the second control region, said second cylinder synchronous signal being generated in synchronism with the stroke of the operating cycle of the second cylinder and after generation of said first synchronous signal, the second cylinder synchronous signal being generated before the stroke of the operating cycle of the third cylinder; and controlling an amount of intake air to be supplied to the cylinder in accordance with the calculated opening timing of the intake valve.

3. A method as claimed in claim 1, further comprising setting a threshold engine speed which is near an idling engine speed and resides between the first and second control regions.

4. A control system for an internal combustion engine having an electromagnetically actuated intake valve for a first cylinder, comprising:

an engine speed sensor for detecting an engine speed of the engine;

a cylinder synchronous signal sensor for detecting cylinder synchronous signals which correspond to predetermined timings of operating cycles of the first cylinder and other cylinders, respectively; and a control unit configured to perform
determining a plurality of control regions in accordance with the engine speed detected by the engine speed sensor, and calculating and setting opening and closing timings of the intake valve for the first cylinder, in synchronism with different cylinder synchronous signals respectively in the different control regions.

5. A control system for an internal combustion engine having an electromagnetically actuated intake valve for a cylinder, comprising:

a control unit configured to perform forming first and second control regions in accordance with an engine speed of the engine, said first control region being higher in engine speed than said second control region;

calculating opening and closing timings of the intake valve in synchronism with a first cylinder synchronous signal in said first control region, said first cylinder synchronous signal being generated in synchronism with a stroke of an operating cycle of a cylinder;

calculating the opening and closing timings of the intake valve in synchronism with a second cylinder synchronous signal in said second control region, said second cylinder synchronous signal being generated in synchronism with the stroke of the operating cycle of a cylinder and after generation of the first cylinder synchronous signal; and controlling an amount of intake air to be supplied to the cylinder in accordance with the calculated opening timing of the intake valve.

6. A control system for an internal combustion engine having an electromagnetically actuated intake valve for a cylinder, comprising:

means for forming first and second control regions in accordance with an engine speed of the engine, said first control region being higher in engine speed than said second control region;

means for calculating opening and closing timings of the intake valve in synchronism with a first cylinder synchronous signal in the first control region, said first cylinder synchronous signal being generated in synchronism with a stroke of an operating cycle of a cylinder;

means for calculating the opening and closing timings of the intake valve in synchronism with a second cylinder synchronous signal in the second control region, said second cylinder synchronous signal being generated in synchronism with the stroke of the operating cycle of a cylinder and after generation of the first cylinder synchronous signal; and means for controlling an amount of intake air to be supplied to the cylinder in accordance with the calculated opening timing of the intake valve.

* * * * *